Figure 1:
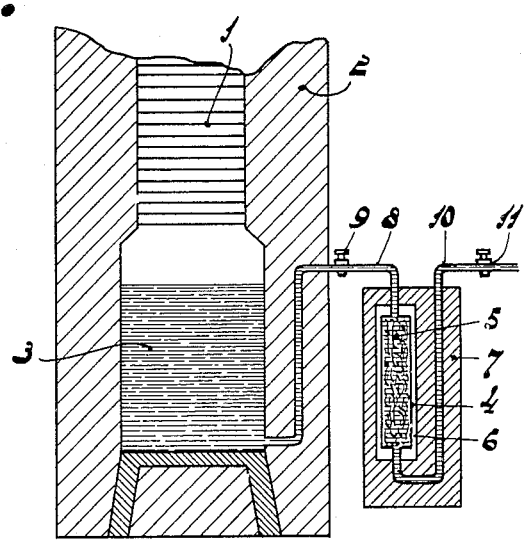

Dec. 13, 1932.    J. A. VAN GESSEL    1,891,125
PROCESS FOR SEPARATING MIXED GASES
Filed March 13, 1930

Inventor:
Johannes Antoon van Gessel,
by
Attys.

Patented Dec. 13, 1932

1,891,125

UNITED STATES PATENT OFFICE

JOHANNES ANTOON VAN GESSEL, OF EINDHOVEN, NETHERLANDS, ASSIGNOR TO N. V. PHILIPS' GLOEILAMPENFABRIEKEN, OF EINDHOVEN, NETHERLANDS

PROCESS FOR SEPARATING MIXED GASES

Application filed March 13, 1930, Serial No. 435,571, and in the Netherlands April 19, 1929.

When producing liquid gases by means of cryogens comparatively little attention has hitherto been paid to the purification of gases which are in the liquid phase. It has been proposed to purify liquid oxygen by previously vaporizing it and by subsequently removing the impurities from the gaseous oxygen. If it is desired, however, to use or to transport oxygen in the liquid state, then the gaseous purified oxygen would have to be reduced again to the liquid phase. It goes without saying that this mode of purification in which the oxygen is first vaporized and subsequently condensed again, is very complicated.

The present invention has for its purpose to provide a very simple and efficient process for purifying a gas which is in the liquid condition and at atmospheric pressure.

According to the invention a gas which is in the liquid state is purified by contact of an absorbent substance therewith, for example, charcoal or silica gel, which may be effected for instance, by leading it over the absorbent or by mixing it therewith. It is obvious that this mode of purification is very simple. Moreover, it has been found, that in case liquid gases are brought into contact with the absorbent the latter has a greater selectivity in regard to the impurities than in case this takes place in the gaseous state.

By the term "gas which is in the liquid state" is meant hereinafter a material which is volatile at room temperature but becomes liquid at a lower temperature.

It is also possible that the purifying action is not effected by absorption but by adsorption or by both actions. Whenever the term "absorption" is used hereinafter, it consequently also includes "adsorption".

The present invention may be applied to advantage when purifying liquid oxygen produced from liquid air by means of a distilling apparatus.

If it is desired to withdraw gaseous oxygen from the distilling apparatus, then the above advantage of a better absorption of the impurities may be obtained by condensing the gaseous oxygen before bringing it into contact with the absorbent.

In the process above referred to the ratio between the quantity of the absorbent and that of the liquid gas is such that the partial pressure of the substances absorbed in the absorbent remains low.

At intervals the absorbed substances may be extracted from the absorbent, for example, by aspiration and (or) by heating, so that the absorbent is regenerated. In the case these liberated substances are obtained from liquid oxygen produced by means of liquid air, they can be very economically used for the production of krypton or xenon, since these gases may be separated, for example, by fractional absorption or rectification or chemically, from the materials which are extracted from the absorbent. It has been found that this process permits of producing krypton and xenon in an economical way since the quantity of krypton or xenon which may be produced from a definite quantity of air is rather large and the production may take place as a by product in the production of liquid oxygen.

The vessel containing the absorbent used may frequently be housed to advantage in a distilling apparatus, for example, in the insulating shell of the apparatus or in the portion of the apparatus containing liquid gas during the operation.

Figure 2:
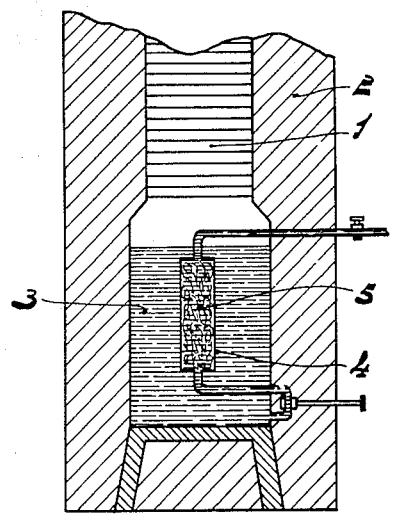

The invention will be more clearly understood by reference to the accompanying drawing, representing by way of example, part of a distilling apparatus and a filter-vessel according to the invention, and wherein Figs. 1 and 2 are vertical sections through two forms of my invention.

In Fig. 1 the rectifying column of a distilling apparatus which is constructed in known manner, is denoted by 1, the insulating shell of this apparatus being designated by 2. When using this distilling apparatus for producing liquid oxygen from liquid air, a quantity of liquid oxygen is formed in the portion 3 of the rectifying column. This liquid oxygen contains various impurities which are chiefly constituted by hydrocarbons, carbonic acid, krypton and xenon. In order to purify this liquid oxygen it is passed through the vessel 4 containing the absorbent 5, for example, cocoa-nut charcoal or silica gel.

The vessel 4 is disposed in an exhausted receptacle 6 which is housed in the heat-insulating shell 7. The vessel 4 communicates with the rectifying column through the tubing 8 which may be closed by means of a cock 9. The purified liquid may be drained off through the pipe 10 including a cock 11.

It has been found that substantially all impurities of the liquid oxygen are retained by the absorbent 5, especially if the quantity of the absorbent relative to the oxygen to be purified is so large, that the partial pressure of the absorbed substances remains low.

Moreover, the oxygen produced according to the process above referred to may be used to advantage for various medical, hygienical and other purposes, for which unpurified oxygen is less suitable, for example, on account of a disagreeable oil-smell which may occur when compressing the air from which the oxygen is produced. In addition the krypton and xenon contained in the oxygen are retained by the absorbent, so that the impurities absorbed may be used as initial substance for the production of these gases. To this effect the substances retained by the absorbent 5 are extracted from the latter at intervals, which may be effected by interrupting the communication between the vessel 4 and the rectifying column and by removing, by exhaustion, the absorbed impurities from the absorbent, to which end the vessel 4 is slightly heated. From the liberated materials krypton and xenon may be separated in known manner, for example, by fractional absorption or distillation or by resorting to chemical means. It has been found that in this manner considerable quantities of krypton and xenon may be produced, these quantities constituting a very large portion of the krypton and xenon contained in the quantity of air consumed.

If it is required to withdraw gaseous oxygen from the distilling apparatus, then this oxygen may first be condensed, whereupon it is passed over the absorbent.

The filter-vessel 4 shown in Fig. 1 may be connected to any distilling apparatus. Sometimes such a mounting of the filter-vessel is attended with the drawback that the vessel acquires too high a temperature when being out of operation for some time, due to which the absorption of the impurities will be less complete during the first moments after the apparatus is put into service again. This drawback may be obviated by housing the filter-vessel in the distilling apparatus, for example, or in the portion containing liquid oxygen. Though this mounting of the filter-vessel permits of obviating the above drawback, another difficulty may be encountered. When housing the filter-vessel in the distilling apparatus the absorbed substances can be removed from the absorbent only by taking the distilling apparatus out of operation, since otherwise the temperature of the absorbent will remain too low for removing the absorbed substances from it.

It is also possible to dispose the absorbent directly in the rectifying column, so that the liquid oxygen produced contacts with the absorbent.

What I claim is:—

1. A process for separating mixed gases which consists in bringing the mixture of gases in the liquid state into contact with absorbing substance, after which this substance is deprived from the absorbed gases.

2. A process for separating mixed gases which consists in bringing the mixture of gases in the liquid state into contact with absorbing substance, after which this substance is deprived from the absorbed gases by aspiration.

3. A process for separating crypton and xenon from oxygen according to which the mixture of oxygen, crypton and xenon is brought in the liquid state into contact with absorbing substance, after which this substance is deprived from absorbed gases, crypton and xenon being separated from the deprived gases.

4. A process for separating mixed gases which consists in bringing the mixture of gases in the liquid state into contact with absorbing substance having a selective absorbent action in respect of a liquid constituent of said mixture, after which said substance is deprived of the absorbed gases.

5. A process for separating mixed gases which consists in bringing the mixture of gases in the liquid state into contact with silica gel after which the silica gel is deprived of the absorbed gases.

6. A process for separating mixed gases which consists in bringing the mixture of gases in the liquid state into contact with absorbing substance, this substance being in such quantity that the partial pressure of the gases absorbed in said substance remains low, after which this substance is deprived of the absorbed gases.

In testimony whereof I have signed my name to this specification.

JOHANNES ANTOON van GESSEL.